3,141,733
REMOVAL OF IRON FROM AQUEOUS ALUMINUM SULFATE SOLUTION
Raymond Broisman, Linden, N.J., assignor to American Cyanamid Company, New York, N.Y., a corporation of Maine.
Filed July 27, 1961, Ser. No. 127,354
6 Claims. (Cl. 23—123)

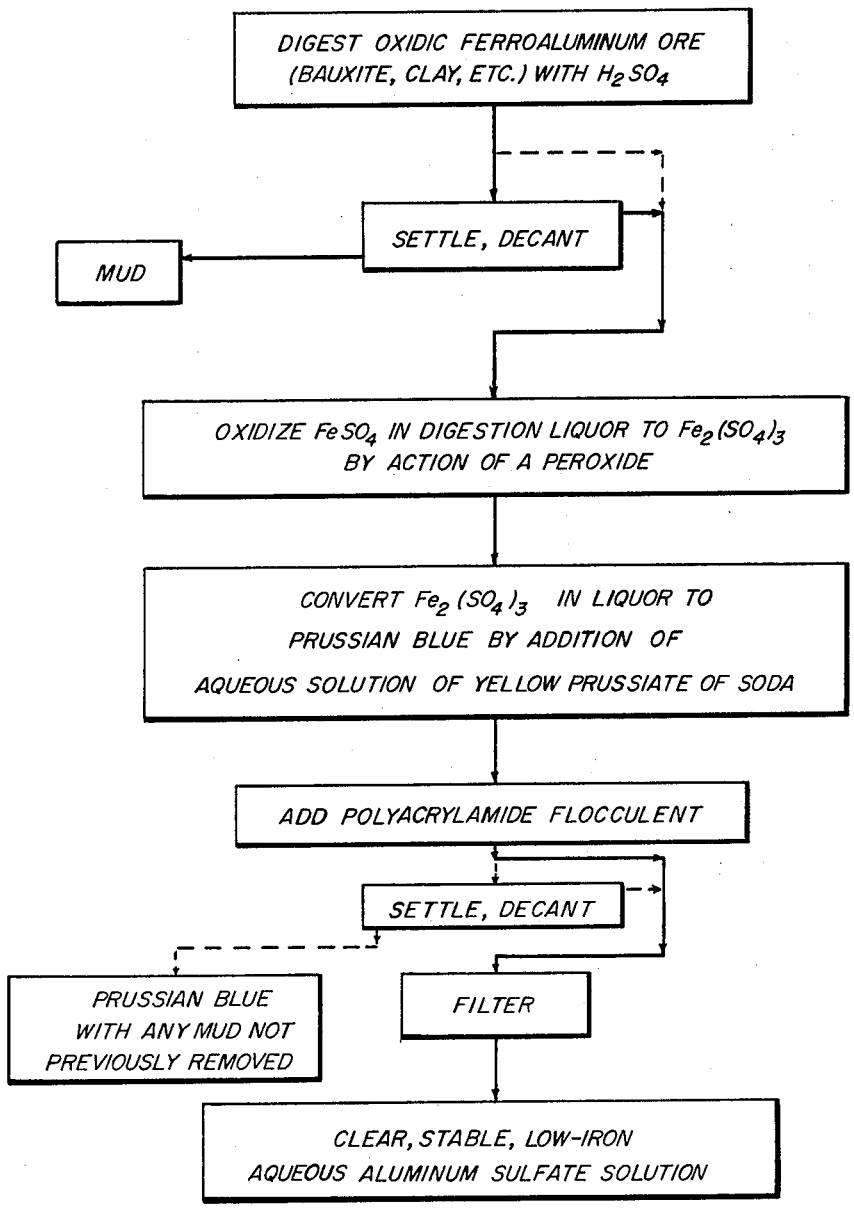

The present invention relates to a method for decreasing the iron content of crude aqueous aluminum sulfate solutions. More particularly, the invention relates to methods for decreasing the iron content of such liquors prepared by digesting an oxidic ferroaluminum ore with sulfuric acid.

At the present time, aqueous aluminum sulfate solutions (often termed "alum" solutions) are generally prepared by digesting a ferroaluminum ore with sulfuric acid to form an aqueous liquor containing the iron and aluminum values of the ore, filtering the liquor from the mud which remains, and removing the iron (which is present as ferrous and ferric sulfates).

It is known that this iron can be largely removed by oxidizing the ferrous iron to ferric iron, adding a water-soluble ferrocyanide to precipitate the iron as Prussian blue, and removing the Prussian blue.

This process has not proved practical because at least part of the Prussian blue which is formed in this manner is highly peptized and is of practically unfilterable (colloidal) particle size; cf. Chadwick et al. U.S. Patent No. 237,816 (1881). Ordinary filters permit sufficient Prussian blue to pass so that the filtrate is a deep blue in color, and filtration procedures which remove these colloidal particles in the past have proved uneconomically slow.

It has been propoesd to add a flocculating agent to the liquor so as to aggregate the Prussian blue particles to a size which can be removed by ordinary filtration. Substantially colorless filtrates are obtained by this method, but a surprising consequence is that the filtrates, on standing quietly for a few hours to a few weeks resume their deep Prussian blue color so that they look as if they had never been treated. The reason why this happens has not been ascertained, but evidently is due to failure of the process to remove the finest Prussian blue particles, which then aggregate on standing to form particles in the visible size range.

The discovery has now been made that a substantial proportion of the iron in digestion liquors of this type described can be rapidly removed with production of stable clear solutions (i.e., solutions which do not develop a blue color on standing) by subjecting the liquor to a series of particular steps.

A preferred embodiment of the process is illustrated in the flow sheet.

In the first principal purification step, substantially all of the ferrous sulfate present in the digestion liquor is oxidized to ferric sulfate by the action of a peroxide. The action of this agent is complete in a few minutes. The use of a peroxide is critical because when the common oxidizing agents are used, the filtered solution develops a blue coloration on standing. If desired, the liquor may be allowed to settle and then decanted from the settled mud.

In the second principal step, the ferric sulfate content of the liquor is converetd to Prussian blue by addition of yellow Prussiate of soda in aqueous solution form. This step likewise requires only a few minutes. Substantially better results are obtained when this agent is added to the liquor as a solution rather than as a powder, as is customary.

In the third principal step, a polyacrylamide flocculent is added in effective amount to aggregate substantially all of the Prussian blue present into particles of filterable dimensions. This agent appears to aggregate all the Prussian blue particles both visible and invisible and its action is similarly complete within a few minutes. This result is not achieved by the action of glue, a widely used flocculating agent.

Thereafter, the liquor is decanted and, if desired, filtered. The result is a clear liquid of slight brownish cast which does not turn blue on standing.

The invention does not depend upon the particular point at which the mud is separated from the liquor, or the particular manner in which the Prussian blue is removed subsequent to the addition of the flocculent. Thus for example in certain instances it may be found preferable to remove the flocculated Prussian blue by filtration, without settling, and such procedure is within the scope of the invention, and if desired removal of the mud may be deferred to the end of the process.

The process is best performed with the liquor at a temperature between about 125° F. and 175° F. At lower temperatures the filtration rate becomes very slow, although excellent removal of Prussian blue is effected. At temperatures near the boiling point, the filtration is comparatively fast but the efficiency of the treatments is somewhat less. The preferred temperature range has the particular advantage of causing rapid destruction of excess peroxide so that substantially none of the yellow prussiate of soda (which is sensitive to oxidation) need be lost even when added shortly after the peroxide.

Hydrogen peroxide is preferred as the oxidizing agent because it decomposes rapidly in the liquor at about 150° F. leaving no ionic or toxic residue. If desired, sodium and potassium peroxides and organic peroxides, for example tertiary butyl hydroperoxide and cumene peroxide can be used in equivalent amounts.

In the process, best results have been obtained when the oxidizing agent is added first, the yellow prussiate of soda second (after the action of the peroxide is substantially complete), and the polyacrylamide flocculent last. However, it is within the scope of the invention to add the polyacrylamide with the yellow prussiate of soda or before it.

For best results, the amount of peroxide oxidizing agent added should be sufficient to oxide substantially all of the ferrous iron present. A positive test for peroxide obtained two or three minutes after addition of this material indicates that sufficient has been added.

The amount of yellow prussiate of soda need not be in excess of that stoichiometrically necessary to convert the ferric sulfate to Prussian blue form according to the theoretical equation:

$$2Fe_2(SO_4)_3 + 3Na_4Fe(CN)_6 \longrightarrow Fe_4[Fe(CN)_6]_3 + 6Na_2SO_4$$

| Ferric sulfate | Yellow prussiate of soda | Prussian blue | Sodium sulfate |

The amount of polyacrylamide flocculent to be added in each instance depends primarily upon the flocculating power of the particular polyacrylamide employed and the electrostatic properties of the particular Prussian blue treated. The minimum effective amount of polyacrylamide flocculent which should be used in any one instance is that which produces a substantially colorless filtrate when the liquor is filtered through a commercial filter, for example, a rotary Oliver vacuum drum filter carrying a normal precoat of filter material. This amount is most conveniently found by actual trial.

The polyacrylamide flocculents are commercial agents known by the names "Super-Floc" and "Accurac" and consist essentially of acrylamide polymerized to a molecular weight in excess of about 1 million. They are non-cationic and thus are either non-ionic or anionic, depending on whether or not a significant proportion of the amide groups present has hydrolyzed during the polymerization. They are added to the liquor as dilute solution. Their flocculating action is usually complete in about 5 minutes.

The invention does not depend upon the particular way in which the ferric sulfate is converted to Prussian blue, and therefore the use of the water-soluble ferrocyanides in general is within the scope of the invention.

The invention will be further illustrated by the examples. These examples are specific embodiments of the invention and are not to be construed as limitations thereon. Parts are by weight unless otherwise stated.

*Example 1*

The following illustrates the comparative effect of a number of oxidizing agents and flocculating agents in the purification of an aluminum sulfate solution having a dissolved content of ferrous sulfate.

A test solution is prepared by digesting bauxite (containing approximately 60% of aluminum calculated as $Al_2O_3$, 1% of $Fe_2O_3$, 2% of $TiO_2$ and 7% of silicious material) with sulfuric acid of 53% strength to form a liquor which contains substantially all of the aluminum and iron contents of the ore as the respective sulfates. The liquor is decanted and is diluted with a water to a 49.0% $Al_2(SO_4)_3 \cdot 14H_2O$ content. It contains 60%–75% of ferrous iron and 25%–40% of ferric iron, both calculated as Fe.

The solution is divided into 1000 cc. portions which are treated at 150° F. as shown in the table below. When an oxidizing agent is employed, the agent is added in 10%–15% excess over the stoichiometric amount required to convert all of the ferrous sulfate to ferric sulfate; the presence of a substantial excess in each instance after filtration is determined by titration of the solution using sodium ferricyanide or potassium ferricyanide to give Turnbull's blue.

There is then added the stoichiometric amount of yellow prussiate of soda powder to convert all of the ferric sulfate to Prussian blue. The solution is gently stirred for a few minutes to dissolve the prussiate of soda and to permit its action to go to completion.

There is then pipetted into the solution with gentle stirring sufficient of 0.5% aqueous solution of polyacrylamide (molecular weight 5,000,000 calculated from intrinsic viscosity) to flocculate the Prussian blue; about 25 cc. of solution is needed for the purpose. The polyacrylamide is essentially non-ionic although 1% of the amide substituents of the parent acrylamide underwent hydrolysis during polymerization.

The solution is then filtered through a Büchner funnel carrying diatomaceous earth (Hyflo) as filter aid. The filtrate is analyzed for total iron content. A sample is rated as to its Prussian blue color immediately and, when no blue is present, at intervals up to six weeks.

A color rating of "None" is given to solutions which are nearly as clear as water; such solutions generally have a slight brownish tint. A rating of "Blue" is given to solutions which have a perceptible bluish tint. In most instances the "Blue" solutions are opaque when viewed in a bottle and are of a deep, pure blue.

Results are as follows:

| Run No. | Oxidizing Agent | Flocculent | Fe Content | Color of Filtered Solution | |
|---|---|---|---|---|---|
| | | | | Initial | After 6 Weeks |
| A (Control) | None | None | 0.30 | Blue | Blue. |
| B | do | Glue | | None | Do. |
| C | $NaClO_3$ | Polyacrylamide | 0.15 | do | Do. |
| D | $KMnO_4$ | do | 0.12 | do | Do. |
| E | $NaNO_3$ | do | 0.16 | do | Do. |
| F | $Na_2CrO_7$ | do | 0.21 | do | Do. |
| G | $K_2CrO_4$ | do | 0.18 | do | Do. |
| 1[a] | $H_2O_2$ | do | 0.06 | do | None. |
| 2 | $Na_2O_2$ | do | 0.07 | do | Do. |

[a] Yellow prussiate of soda added as an aqueous solution.

*Example 2*

The procedure of Run 1 of Example 1 is repeated except that the polyacrylamide used has a molecular weight of approximately 2,500,000 and is distinctly anionic resulting from hydrolysis of 3% of the amide groups to carboxyl groups.

Results are substantially the same.

I claim:

1. Process for decreasing the iron content of the crude aqueous aluminum sulfate solution prepared by digestion of a ferroaluminum ore, which comprises oxidizing substantially all of the ferrous sulfate in said solution to ferric sulfate by the action of a peroxide, adding yellow prussiate of soda as an aqueous solution and thereby converting at least part of the ferric sulfate in said solution to Prussian blue particles of substantially non-filterable dimensions, adding a polyacrylamide flocculent whereby substantially all of said Prussian blue is aggregated to flocs of filterable dimensions, and filtering said flocculated Prussian blue from said alum solution.

2. A process according to claim 1 wherein the temperature of the aluminum sulfate solution is between 125° F. and 175° F.

3. A process according to claim 1 wherein the peroxide is hydrogen peroxide.

4. A process according to claim 1 wherein the yellow prussiate of soda and polyacrylamide are separately added as aqueous solutions.

5. A process according to claim 1 wherein the yellow prussiate of soda is added after action of the oxidizing agent is substantially complete.

6. A process according to claim 1 wherein the polyacrylamide is added after formation of the Prussian blue is substantially complete.

References Cited in the file of this patent

UNITED STATES PATENTS

| 237,816 | Chadwick et al. | Feb. 15, 1881 |
| 2,022,012 | Svendsein | Nov. 26, 1935 |

FOREIGN PATENTS

| 542,102 | Canada | June 11, 1957 |

OTHER REFERENCES

Mellor: "A Comprehensive Treatise on Inorganic and Theoretical Chemistry," Longmans, Green & Co., New York, N.Y., vol. 1, 1922, page 943.